(12) United States Patent  (10) Patent No.: US 9,178,275 B2
Schultheiss  (45) Date of Patent: Nov. 3, 2015

(54) PLANAR ANTENNA WITH COVER

(75) Inventor: Daniel Schultheiss, Hornberg (DE)

(73) Assignee: VEGA GRIESHABER KH, Wolfach (DE)

(*) Notice: Subject to any disclaimer, the term of this patent is extended or adjusted under 35 U.S.C. 154(b) by 364 days.

(21) Appl. No.: 13/187,620

(22) Filed: Jul. 21, 2011

(65) Prior Publication Data

US 2012/0019423 A1   Jan. 26, 2012

Related U.S. Application Data

(60) Provisional application No. 61/372,222, filed on Aug. 10, 2010.

(30) Foreign Application Priority Data

Jul. 23, 2010  (EP) .................................... 10007669

(51) Int. Cl.
| | |
|---|---|
| *H01Q 19/26* | (2006.01) |
| *H01Q 21/00* | (2006.01) |
| *H01Q 1/42* | (2006.01) |
| *H01Q 13/02* | (2006.01) |
| *G01F 23/284* | (2006.01) |
| *H01Q 19/06* | (2006.01) |

(Continued)

(52) U.S. Cl.
CPC ................ *H01Q 1/42* (2013.01); *G01F 23/284* (2013.01); *H01Q 1/225* (2013.01); *H01Q 19/062* (2013.01); *H01Q 21/065* (2013.01)

(58) Field of Classification Search
CPC ....... H01Q 1/225; H01Q 1/42; H01Q 19/062; G01F 23/284
See application file for complete search history.

(56) References Cited

U.S. PATENT DOCUMENTS

| 4,743,918 A | 5/1988 | Rannou et al. |
| 4,888,597 A * | 12/1989 | Rebiez et al. ................. 343/789 |
| 2003/0151560 A1 * | 8/2003 | Kienzle et al. ................ 343/786 |

(Continued)

FOREIGN PATENT DOCUMENTS

| CN | 1592845 | 3/2005 |
| CN | 101383343 | 3/2009 |

(Continued)

OTHER PUBLICATIONS

European Pat. Appln. Serial No. 10007669.4 Office Action mailed Mar. 9, 2011, 8 pages-German, English translation, 3 pages.

(Continued)

*Primary Examiner* — Hoang V Nguyen
*Assistant Examiner* — Michael Bouizza
(74) *Attorney, Agent, or Firm* — Andrew F. Young, Esq.; Lackenbach Siegel, LLP (57) ABSTRACT

Provided is a planar antenna based system for use as a radar level meter, microwave barrier or other suitable system. The system includes a planar radiator element arranged on a substrate, and a cover plate element made from a dielectric to cover the planar radiator element. In one alternative embodiment, the cover plate includes a cavity proximate the planar radiator element, into which the microwaves generated by the planar radiator element can be coupled. In another alternative, the cover plate is provided in a surface-flush position against the substrate in the edge region of the cavity. These arrangements may be provided in a plurality so as to support an overall system containing multiple radiator elements.

33 Claims, 6 Drawing Sheets

(51) Int. Cl.
*H01Q 21/06* (2006.01)
*H01Q 1/22* (2006.01)

(56) References Cited

U.S. PATENT DOCUMENTS

| | | | |
|---|---|---|---|
| 2007/0252768 A1 | 11/2007 | Mohamadi | |
| 2009/0051467 A1* | 2/2009 | McKinzie, III | 333/219 |
| 2009/0066590 A1* | 3/2009 | Yamada et al. | 343/702 |
| 2009/0121954 A1 | 5/2009 | Binzer | |
| 2009/0251375 A1 | 10/2009 | Margomenos | |

FOREIGN PATENT DOCUMENTS

| | | |
|---|---|---|
| CN | 101438458 | 5/2009 |
| CN | 101521314 | 9/2009 |
| DE | 19800306 | 7/1999 |
| DE | 10 2005 002 505 | 7/2006 |
| EP | 0 149 400 | 12/1984 |
| EP | 0 858 126 | 2/1988 |
| EP | 0 301 580 | 7/1988 |
| EP | 2 083 479 | 1/2009 |
| WO | WO 03/085365 | 10/2003 |
| WO | WO 2007/124860 | 11/2007 |

OTHER PUBLICATIONS

Novel Millimeter ACC Antenna Feed by D.G. Spencer (Dynex Semiconductor), © 2000 The Institution of Electrical Enginners, 9 pages.
Chinese Patent Appln. No. 2011 1026 5772.4 issued Dec. 9, 2013, 9 pages—English, 7 pages-Chinese.

* cited by examiner

PLANAR ANTENNA WITH COVER

CROSS REFERENCE TO RELATED APPLICATIONS

This application relates to and claims priority from EP App. No. 10 007 669.4 filed Jul. 23, 2011, the entire contents of which are incorporated herein by reference. This application also relates to and claims priority from U.S. Ser. No. 61/372,222 filed Aug. 10, 2010, the entire contents of which are also incorporated herein by reference.

FIGURE FOR PUBLICATION

FIG. 1

BACKGROUND OF THE INVENTION

1. Field of the Invention

The present invention relates to a planar antenna with a cover. More specifically, the present invention relates to a planar antenna for a radar level meter or a microwave barrier system.

2. Description of the Related Art

A planar antenna for a radar level meter is known from DE 198 00 306 A1, the contents of which are incorporated herein by reference, in which an axial HF input is achieved by means of planar radiator elements (patch antennas) arranged on a substrate at the end face of a waveguide.

There are applications in level measurement where detrimental high temperature or high pressure can occur and the planar antenna can also be exposed to a chemically corrosive atmosphere.

Figure 12:
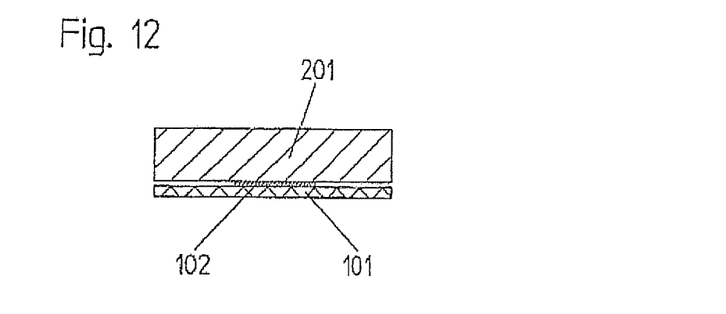

Therefore, in the related art, the planar radiator elements arranged on a substrate are covered with a sheet of ceramics or PTFE (polytetrafluorethylene, such as Teflon), in order to achieve in particular an adequate chemical resistance. Such a planar antenna is shown schematically in FIG. 12. Here, a planar radiator element 102 is arranged on a circuit board 101 as the substrate and covered flush with the surface by a PTFE cover 201. But this has highly negative influence on the HF properties of the individual planar radiator elements, in particular, only a slight bandwidth is available. Moreover, the cover also has great influence on the patch geometry. Unfortunately, detriments remained.

In order to improve the HF properties of the antenna and the chemical resistance, WO 2007/124860 A1, which is incorporated herein by reference, proposes placing a planar radiator element directly on the back side of such a cover, separating the region outside the planar antenna from the region inside it in the way of a process separation, such a cover being made from ceramics or glass. Thanks to this arrangement of the radiator element inside the antenna, a good seal against the surroundings, i.e., the process surroundings, can be achieved. Unfortunately, the drawback, is the use of ceramics or glass, since this leads to very high costs in production, especially in regard to the mounting and the necessary sealing work.

Finally, it is also known how to arrange the cover with a distance of half a wavelength of the microwaves or a multiple thereof in front of the planar radiator element. But, again unfortunately, this has the effect of greatly reducing the pressure bearing ability and therefore one must again resort in disadvantageous manner to harder and more pressure-stable materials like glass or ceramics, so that as already mentioned above the manufacturing costs of such a planar antenna rise considerably.

Thus, the inventors have recognized the problem and have proposed a solution so as to indicate a planar antenna of the kind mentioned at the outset, having an improved construction and thus being easy to produce, without having the above-mentioned disadvantages. In particular, such a planar antenna should be able to withstand a high process pressure.

Accordingly, there is a need solved by a planar antenna with a cover with the features of proposed invention including an adaptive radar level meter or microwave barrier, as well as other systems.

SUMMARY AND ASPECTS OF THE INVENTION

One aspect of the present invention is to provide a planar antenna based system for use as a radar level meter, microwave barriers or other suitable systems. The system includes a planar radiator element arranged on a substrate, and a cover plate element made from a dielectric to cover the planar radiator element. In one alternative embodiment, the cover plate includes a cavity proximate the planar radiator element, into which the microwaves generated by the planar radiator element can be coupled. In another alternative, the cover plate is provided in a surface-flush position against the substrate in the edge region of the cavity. These arrangements may be provided in a plurality so as to support an overall system containing multiple radiator elements.

One aspect of the present invention is to provide such a planar antenna for a radar level meter or a microwave barrier, comprising at least one planar radiator element arranged on a substrate and a cover plate made from a dielectric to cover the planar radiator element. Furthermore, the present invention proposes that the cover plate has a cavity in the region of the at least one planar radiator element, into which the microwaves generated by the planar radiator element can be coupled, and for support against pressure forces acting on the cover plate the cover plate lies surface-flush against the substrate at least in the edge region of the cavity in a bearing contact manner as will be understood from the accompanying drawing and description.

Another aspect of the present invention is that thanks to these cavities in the cover plate, the planar radiator element can be configured and optimized so that it seemingly beams the microwaves produced directly out into the air. This achieves a higher bandwidth and also allows for the use of the invention in adaptive systems.

As will be further understood, in one alternative aspect of the present invention, the supporting of the cover plate against the substrate, and this above the edge region of the cavity, has the shape of a web, or is web-like, between the cavities especially when several cavities are provided, results in a higher pressure load, since the pressure forces are diverted onto the substrate via the supported edge region or via the webs formed between several cavities and not through contact with the operational element.

Such a cover plate, made of plastic for example, can easily be produced by an injection molding method.

According to one advantageous modification of the invention, the cover plate has a thickness in the region of the cavity in the orthogonal direction with respect to the substrate that corresponds to half the wavelength or an integer multiple of the half wavelength of the microwaves produced. In this way, there is a transition from the cavity into the surroundings of the invented planar antenna that has a maximum reflection loss and a minimum transmission loss.

In another embodiment of the invention, the cover plate has a dielectric arrangement in the region of the cavity to shape the beam of microwaves generated by the planar radiator element. Preferably, this dielectric arrangement is fashioned as a lens, so that the surface of the cover plate in the radiating direction of the microwaves is shaped either convex or concave. With such a dielectric lens, the radiation characteristic can be improved for the radiator element. In addition, one achieves the effect that condensate forming on the surface of the cover plate can better drip off from the tips and edges of the lens and therefore such condensate cannot produce any reflections or attenuations in the beam path of the microwaves. Reflections in this area would lead to an increased "antenna ringing", which might lessen the sensitivity of the level sensor in the near range and therefore a measurement might drop out earlier. Thus, an attenuation in this area would reduce the sensitivity along the entire measurement range.

In an especially advantageous embodiment of the invention, the cavity is shaped as an antenna horn to form a horn antenna, and preferably the inner surface of the antenna horn is conductive, in particular, formed with a metallization. In this way, one additionally achieves a focusing of the radiation of the planar radiator element and a reduction of side lobes (minor lobes) of the radiation characteristic of the planar antenna.

As another advantage of the proposed invention, the production of such a horn antenna in the cavity is especially easy when, according to one modification of the invention, a horn antenna insert is used, being inserted in the cavity to form the antenna horn. Preferably, such a horn antenna insert can be made from metallized plastic or entirely of metal.

When using an array of planar radiator elements, a better decoupling of the individual radiator elements is achieved by configuring the particular cavity as an antenna horn.

In yet another embodiment of the invention, the cavity is fashioned as a circular cylinder or as a cylinder with a polygon as the base surface.

Furthermore, according to one embodiment of the invention, it is especially advantageous to provide a regular arrangement of planar radiator elements on the substrate and to arrange the cavities provided in the cover plate in accordance with the regular arrangement of radiator elements.

Finally, according to one embodiment of the invention, the cover plate is made of polytetrafluorethylene (PTFE), polypropylene (PP) or polyether ether ketone (PEEK), which achieves a high chemical resistance. Moreover, these materials are easy to work by means of an injection molding process known to those of skill in the art, so that this cover plate can be made economically with the cavities of the invention.

The making of the cover plate from aluminum ceramics (such as Al2O3, and those containing Al2O3) likewise leads to a high chemical resistance and furthermore to a high mechanical loading capacity.

The above, and other aspects, features and advantages of the present invention will become apparent from the following description read in conjunction with the accompanying drawings, in which like reference numerals designate the same elements.

BRIEF DESCRIPTION OF THE DRAWINGS

The same or equivalent parts in FIG. 1 to 12 are provided with identical reference numbers.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 1:
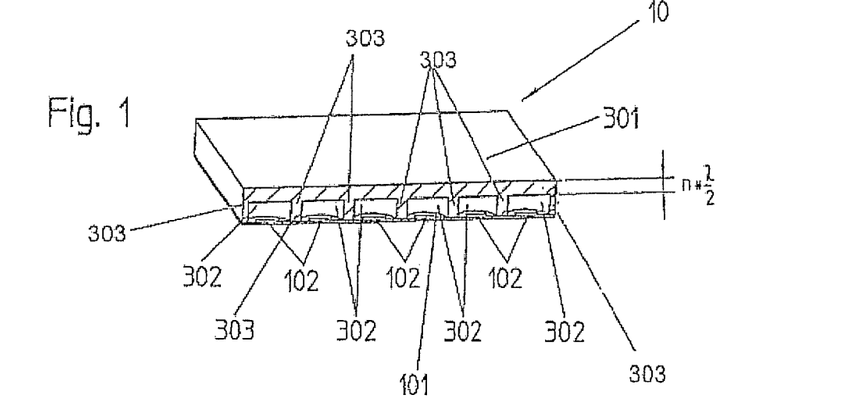
FIG. 1, provides a perspective sectional view of a planar antenna according to the invention as a first sample embodiment.
Figure 2:
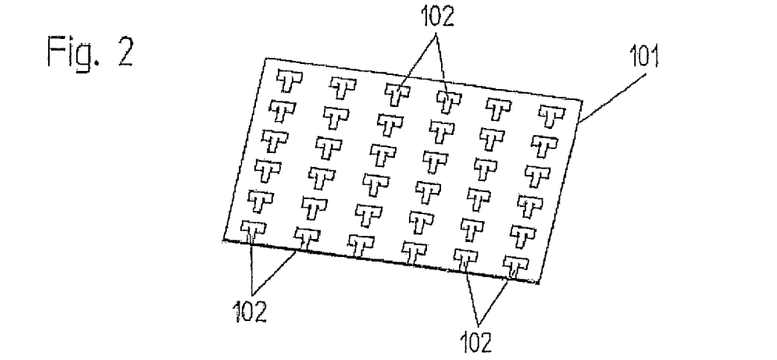
FIG. 2, provides a perspective representation of the antenna array of the planar antenna of FIG. 1.

A first sample embodiment is shown by FIG. 1 to 4 in different representations. The planar antenna 10 of FIG. 1 comprises a substrate 101, which according to FIG. 2 has several rows of regularly arranged planar radiator elements (patch antennas) 102, as well as a cover plate 301, whose bottom side according to the representation of FIG. 3 has cavities 302 of circular cylindrical shape for the individual radiator elements 102, so that each individual radiator element 102 lies in a cavity 302, as can be seen in FIG. 1.

Figure 3:
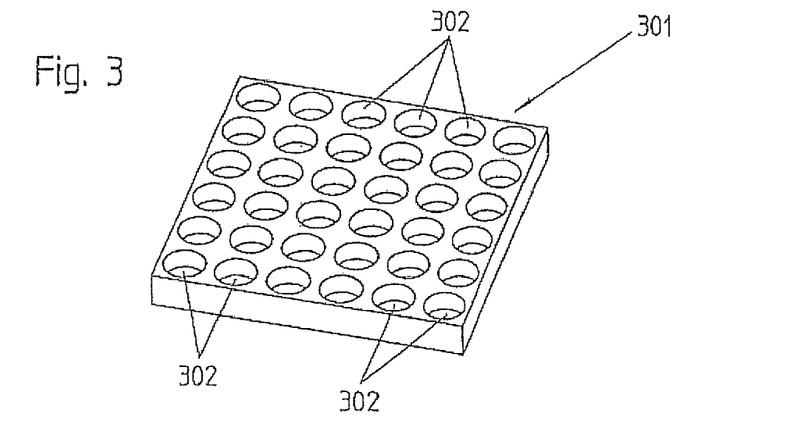
FIG. 3, provides a perspective representation of the cover plate of the planar antenna of FIG. 1 in a view of the bottom side.

The region 303 lying between the cavities 302 has a web like structure and, according to FIG. 3, lies surface-flush on the substrate 101, so that it produces a support against the pressure forces acting on the cover plate 301, and the substrate 101 for its part can be supported against a plate or a flange 304 arranged underneath.

In the next sample embodiments described, for sake of simplicity, the representation of such a plate 304 or such a flange 34 is omitted from the corresponding figures.

The thickness of the cover plate 301 remaining in the region of the cavities 302 in the representation of FIG. 1 amounts to half a wavelength of the microwaves generated by the radiator elements 102, or a multiple thereof.

Figures 4, 5:
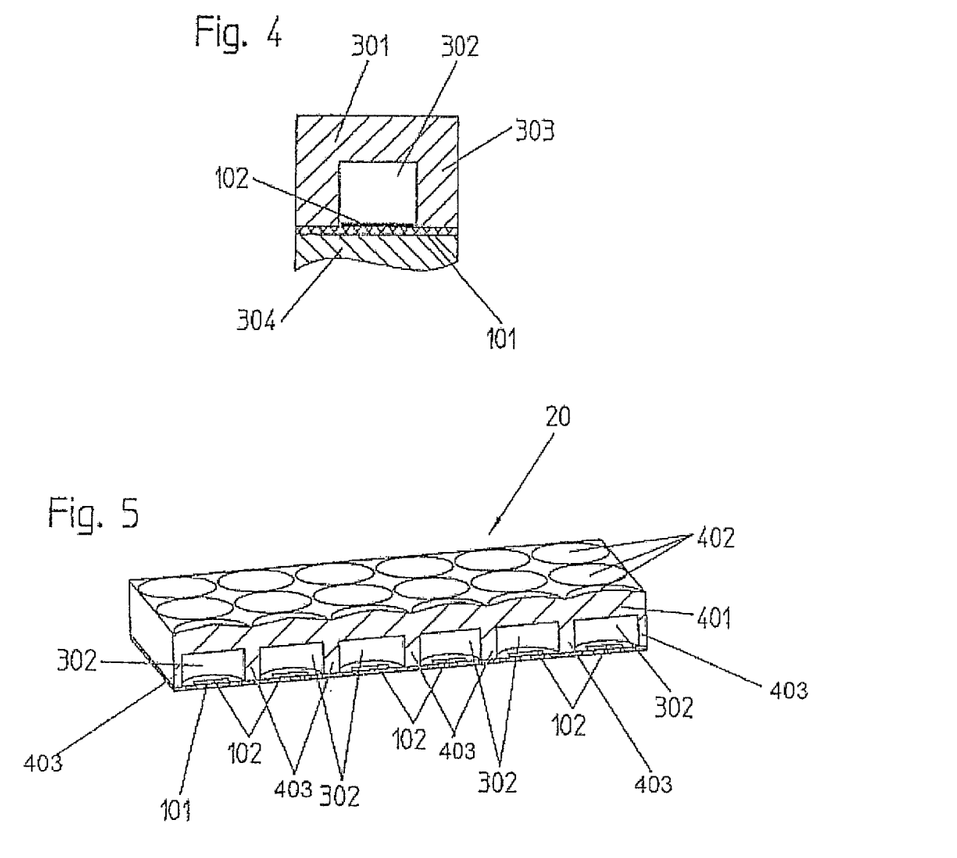
FIG. 4, provides a sectional view of an individual radiator element of the planar antenna of FIG. 1.
FIG. 5, provides a perspective sectional view of a planar antenna according to the invention with convex dielectric lenses as a second sample embodiment.
Figure 6:
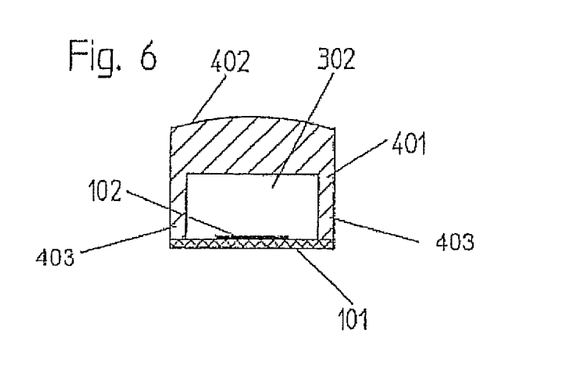
FIG. 6, provides a sectional view of an individual radiator element of the planar antenna of FIG. 5.

The second sample embodiment of a planar antenna 20 per FIG. 5 is constructed similar to that of FIG. 1, but in contrast with the latter it comprises a cover plate 401 whose surface has convex elevations in the region of the cavities 302, so that as is especially evident from FIG. 6 these convex elevations for each radiator element 102 serve as a dielectric lens 402 to improve their radiation characteristics. Also, in this sample embodiment according to FIGS. 5 and 6, the part 403 of the cover plate 401 formed between the cavities 302 is in the shape of a web, so that the cover plate 401 can be supported on the substrate 101 above this web like part 403.

Figure 13:
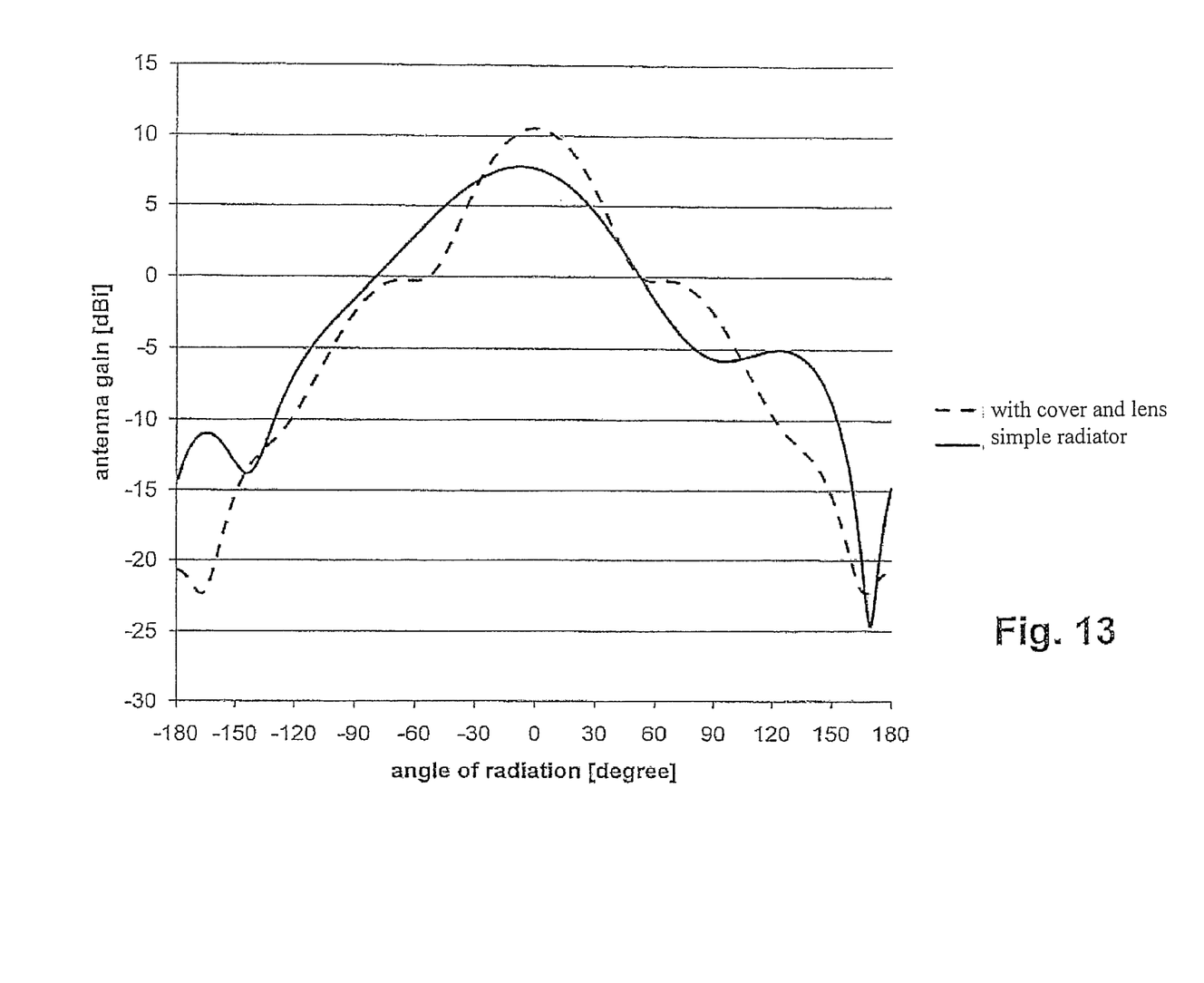

The diagram of FIG. 13 shows an antenna direction diagram of an individual radiator element 102 constructed according to FIG. 6, plotted with a 3D field simulation program at 24 GHz and shown by broken line, as compared to an antenna direction diagram of a planar radiator element of the prior art, shown by solid line. One recognizes that the antenna direction diagram of the planar radiator element 102 of the invention has an antenna gain higher by around 3 dB as compared to the antenna direction diagram of the radiator element of the prior art and, moreover, the side lobes are reduced relative to the main radiation.

Figure 14:
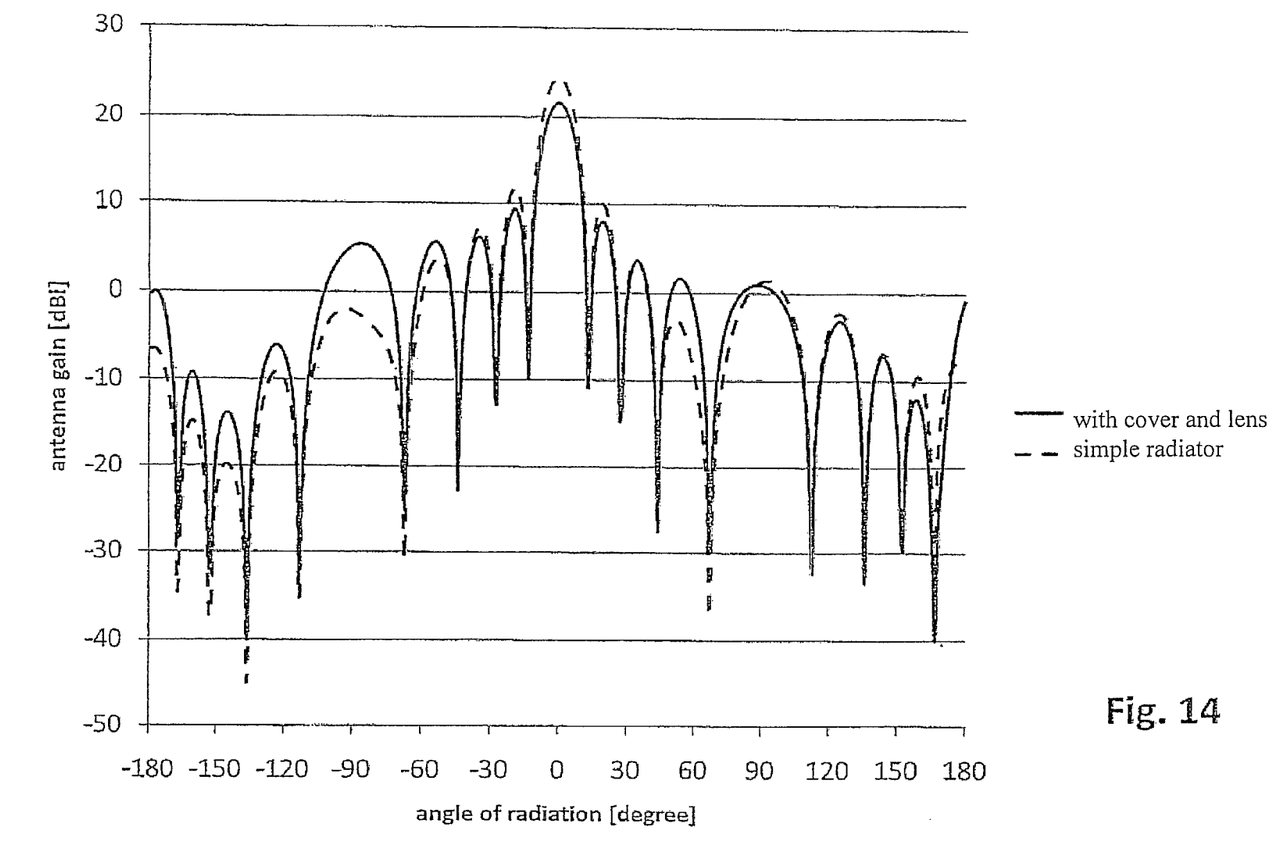
FIG. 14, provides an antenna diagram of a planar antenna according to the invention with several planar radiator elements and, for comparison, a planar radiator element of the prior art.

The simulation with a planar antenna 20 of the invention per FIG. 5 with an array of 5×5 radiator elements 102 likewise leads to better results as compared to a corresponding planar antenna of the prior art, as shown by the diagram of FIG. 14. Thus, the antenna direction diagram of the planar antenna 20 of the invention, shown by broken line, likewise shows an antenna gain higher by around 3 dB as compared to the antenna direction diagram of the planar antenna of the prior art, shown by solid line, and also the side lobes are smaller relative to the main lobe by 2 to 10 dB of the antenna direction diagram K1, than in the antenna direction diagram K2.

Figure 7:
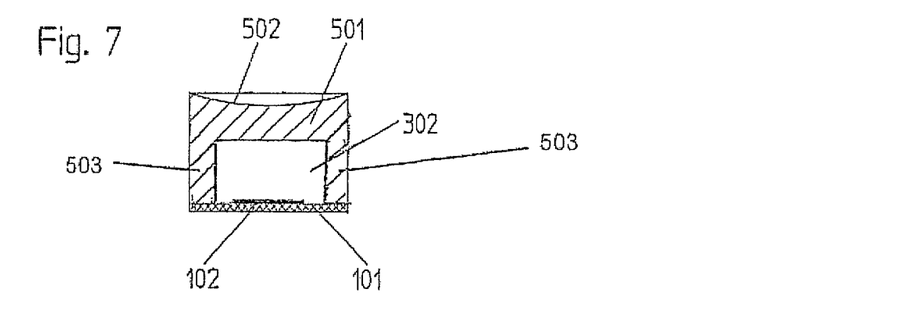
FIG. 7, provides a sectional view of an individual radiator element of a planar antenna with a concave dielectric lens.

The cover plate 401 of FIG. 5 can also be formed with dielectric lenses having a concave shape, as shown in FIG. 7. In this FIG. 7, a cover plate 501 is shown in the region of an individual radiator element 102, whose surface is indented concavely in the region of the cavity 302 and thus likewise serves to improve the radiation characteristics for this radiator element 102 as a dielectric lens 502. The cover plate 501, again, is supported on the substrate or circuit board 101 by the web like structure 503 extending between the cavities 302.

Figure 8:
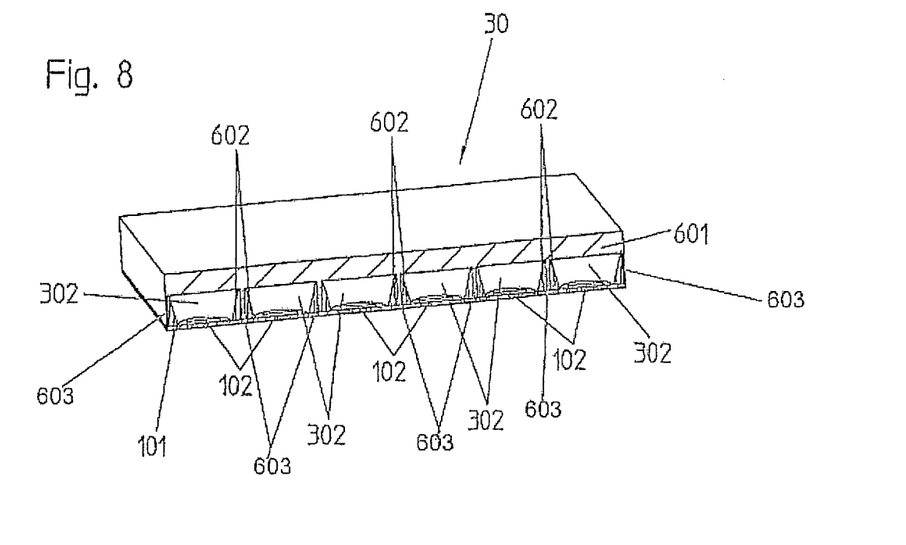
FIG. 8, provides as a third sample embodiment, a perspective sectional view of a planar antenna according to the invention, whose cavities are each fashioned with an antenna horn.

The third sample embodiment of a planar antenna 30 according to the invention, per FIG. 8 and FIG. 9, again corresponds in construction to that of FIG. 1, but whose cover plate 601 has cavities 302 that are each fashioned as an antenna horn 602, so that together with the respective radiator element 102 the action of a horn antenna is created. This cover plate 601 as well is supported on the substrate 101 or circuit board 101 by the web like structure 603 extending between the cavities 302.

Figure 9:
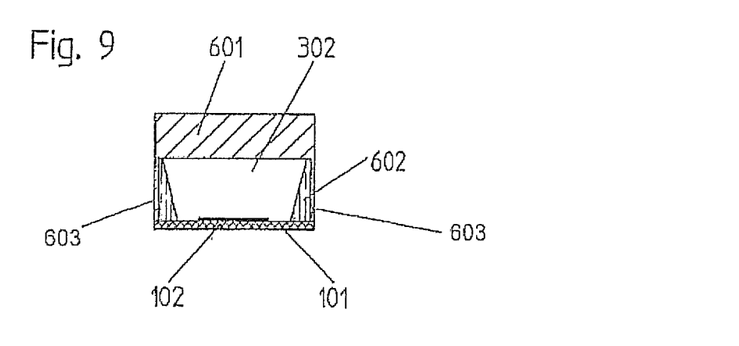
FIG. 9, provides a sectional view of an individual radiator element of the planar antenna of FIG. 8, FIG. 10, provides as a fourth sample embodiment, a perspective sectional view of a planar antenna according to the invention per FIG. 8, whose cover plate has convex lenses, FIG. 11, provides as a fifth sample embodiment, a perspective sectional view of a planar antenna according to the invention per FIG. 8, whose cover plate has concave lenses, FIG. 12, provides a sectional view of a planar antenna of the prior art, FIG. 13, provides an antenna diagram of a planar radiator element according to the invention and, for comparison, a planar radiator element of the prior art.

This antenna horn is formed by means of a horn antenna insert 602 introduced into the cavity 302 and having a conductive surface. For this, this horn antenna insert 602 is made either of metal or of a metallized plastic. In order to produce a cavity 302 whose size corresponds to that of the planar antenna of FIG. 1, the diameter of each cavity 302 of the cover plate 601 is chosen larger than the diameter of the cavity 302 of the cover plate 301 of FIG. 1.

With such a configuration of the cavities 302 as an antenna horn, there is an additional focusing of the individual radiator elements. Moreover, besides reduced side lobes (minor lobes) in the antenna characteristics of the planar antenna 30, there is also achieved a better decoupling of the individual radiator elements 102 by the use of so-called "small horn antennas" in the cavities 302.

Figure 10:
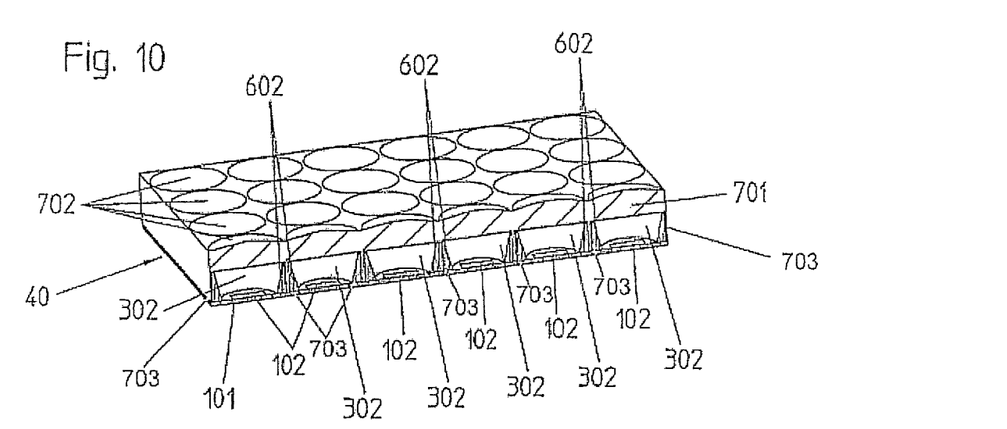

In a forth alternative embodiment, a planar antenna 40 per FIG. 10 is constructed similar to the planar antenna 30 of FIG. 8, with cavities 302 each fashioned as antenna horn, but with the difference that the surface of the cover plate 701 in the region of the cavities 302 has convex elevations, which in accordance with the cover plate 401 of the planar antenna 20 (FIG. 5) serve as a dielectric lens 702 for the microwave radiation generated by the radiator element 102. The web like structure extending between the cavities 302 for support of the cover plate 701 is indicated by reference number 703.

Figure 11:
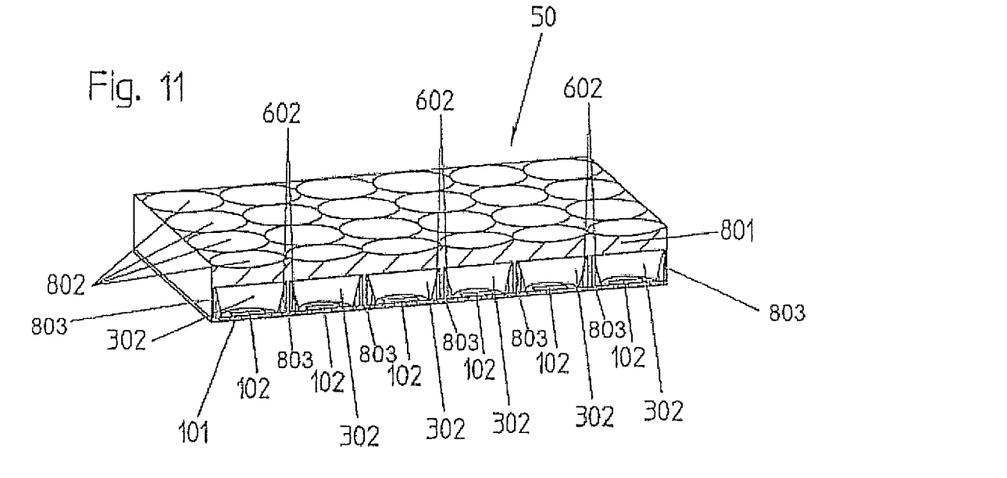

The fifth and last exemplary alternative embodiment of a planar antenna 50 corresponds to the planar antenna 40 of FIG. 10, but with the difference that the surface of the cover plate 801 has concave elevations in the region of the cavities 302, which act as dielectric lenses 802 with concave surface for the microwave radiation generated by the radiator elements 102. The web like structure 803 extending between the cavities 302 again serves for support of the cover plate 801 on the substrate 101.

The dielectric lenses 402, 502, 702 and 802 formed in the cover plates 401, 501, 701 and 801 of the invention (FIGS. 5, 6, 7, 10 and 11) not only produce an improved radiation characteristics, but also allow any condensate forming on the surface of these cover plates to drip off better at the tips and edges of such lenses.

The cover plates 401, 501, 601, 701 and 801 of the invention can be made from PTFE (polytetrafluorethylene), PP (polypropylene) or PEEK (polyether ether ketone) by means of an injection molding process in simple and therefore economical manner. A production of such cover plates from Al2O3 (aluminum oxide ceramics) is also possible in order to achieve an especially high chemical resistance.

The novel features that are considered characteristic of the invention are set forth with particularity in the appended claims. The invention itself, however, both as to its structure and its operation together with the additional aspects and advantages thereof will best be understood from the description of the preferred embodiments of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. 112, paragraph 6 to define the invention.

As noted, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the drawings and specification, there have been disclosed typical embodiments of the invention and, although specific terms are employed, they are used in a generic and descriptive sense only and not for purposes of limitation, the scope of the invention being set forth in the following claims.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A planar antenna, comprising:
a plurality of planar radiator elements arranged on a substrate;
at least one cover plate made from a dielectric to cover the plurality of planar radiator elements;
wherein said cover plate comprises a plurality of cavities in the region of the plurality of planar radiator elements, said plurality of cavities being arranged in accordance with the arrangement of the plurality of radiator elements forming a web-like structure;
wherein said cavities enable a coupling of microwaves generated by the plurality of planar radiator elements; and
wherein said cover plate is at least partially surface-flush on the substrate in at least one edge region of said cavities, thereby enabling support against pressure forces acting on said cover plate during a use thereof.

2. The planar antenna, according to claim 1, wherein:
the cover plate has a thickness proximate the cavities, in an orthogonal direction with respect to the substrate, that corresponds to half the wavelength or an integer multiple of the half wavelength of the microwaves produced.

3. The planar antenna, according to claim 1, wherein:
the cover plate has a dielectric arrangement in a region above the cavities operative to shape the beam of microwaves generated by the planar radiator elements.

4. The planar antenna, according to claim 3, wherein:
the dielectric arrangement is operative as a lens.

5. The planar antenna, according to claim 4, wherein:
the surface of the cover plate is shaped convexly in the direction of radiation of the microwaves to form the lens.

6. The planar antenna, according to claim 4, wherein:
the surface of the cover plate is shaped concave in the direction of radiation of the microwaves to form the lens.

7. The planar antenna, according claim 1, wherein:
at least one of the cavities is shaped as an antenna horn to form a horn antenna.

8. The planar antenna, according to claim 7, wherein:
an inner surface of the antenna horn is conductive, in particular, formed with a metallization.

9. The planar antenna, according to claim 7, further comprising:
a horn antenna insert; and
said horn antenna insert being inserted in at least one of the cavities to form the antenna horn.

10. The planar antenna, according to claim 9, wherein:
the horn antenna insert is made from one of a metallized plastic and a metal.

11. The planar antenna, according to claim 1, wherein:
at least one of the cavities is fashioned as a circular cylinder.

12. The planar antenna, according to claim 1, wherein:
at least one of the cavities is fashioned as a prism with a polygonal base surface.

13. A planar antenna, comprising:
at least one planar radiator element arranged on a substrate;
at least one cover plate made from a dielectric to cover the at least one planar radiator element;
said at least one cover plate further comprising at least one cavity in the region of the at least one planar radiator element, the at least one cavity being configured in accordance with the arrangement of the at least one planar radiator element;
said at least one cavity enabling coupling of microwaves generated by the at least one planar radiator element;
said at least one cover plate being at least partially surface-flush on the substrate in at least one edge region of said cavity, thereby enabling support against pressure forces acting on the cover plate during a use thereof; and
said at least one cover plate having a thickness proximate the at least one cavity, in an orthogonal direction with respect to the substrate, that corresponds to half the wavelength or an integer multiple of half wavelength of the microwaves generated.

14. A planar antenna, comprising:
at least one planar radiator element arranged on a substrate;
at least one cover plate made from a dielectric to cover the at least one planar radiator element;
said at least one cover plate further comprising a cavity in a region of the at least one planar radiator element;
said cavity enabling coupling of a beam of microwaves generated by the at least one planar radiator element;
said at least one cover plate being at least partially surface-flush on the substrate in at least one edge region of said cavity, thereby enabling support against pressure forces acting on the at least one cover plate during a use thereof; and
said at least one cover plate having a dielectric arrangement in a region above the cavity operative to shape the beam of microwaves generated by the at least one planar radiator element.

15. The planar antenna, according to claim 1, wherein:
the web-like structure extends between the cavities.

16. The planar antenna, according to claim 1, wherein:
the cover plate is made of one of a group comprising: polytetrafluorethylene (PTFE), polypropylene (PP), and polyether ether ketone (PEEK).

17. The planar antenna, according to claim 1, wherein:
the cover plate is made from ceramic materials containing aluminum, said ceramic materials selected from a group including $Al_2O_3$.

18. A planar antenna, comprising:
at least one planar radiator element arranged on a substrate;
at least one cover plate made from a dielectric to cover the at least one planar radiator element;
said at least one cover plate further comprising at least one cavity in the region of the at least one planar radiator element;
said at least one cavity enabling coupling of microwaves generated by the at least one planar radiator element;
said at least one cover plate being at least partially surface-flush on the substrate in at least one edge region of said cavity, thereby enabling support against pressure forces acting on the at least one cover plate during a use thereof;
the at least one cover plate having a thickness proximate the cavity, in an orthogonal direction with respect to the substrate, that corresponds to half wavelength or an integer multiple of the half wavelength of the microwaves generated,
said at least one planar radiator element being in a regular arrangement on the substrate, and
said at least one cavity provided in the at least one cover plate being arranged in accordance with the arrangement of the radiator element to form a web like structure.

19. A planar antenna, comprising:
at least one planar radiator element arranged on a substrate;
at least one dielectric cover plate to cover the at least one planar radiator element;
said at least one cover plate further comprising a cavity in the region of the at least one planar radiator element, the cavity being configured in accordance with the arrangement of the at least one planar radiator element;
said cavity enabling coupling of microwaves generated by the at least one planar radiator element;
said cover plate being at least partially surface-flush on the substrate in at least one edge region of said cavity, thereby enabling support against pressure forces acting on the at least one cover plate during a use thereof;
the cover plate having a thickness proximate the cavity, in an orthogonal direction with respect to the substrate, corresponding to half wavelength or an integer multiple of the half wavelength of the microwaves generated; and
the cavity being shaped as an antenna horn.

20. A planar antenna for a radar level meter or a microwave barrier, said antenna comprising:
a regular arrangement of planar radiator elements provided on a substrate; and
a cover plate made from a dielectric to cover the planar radiator elements;
wherein the cover plate has a plurality of cavities in a region of the regular arrangement of planar radiator elements, into which microwaves generated by the planar radiator elements can be coupled,
wherein the cover plate lies surface-flush against the substrate at least in the edge region of the cavities to provide support against pressure forces acting on the cover plate, and
wherein the cavities provided in the cover plate are arranged in accordance with the regular arrangement of the radiator elements to form a web-like structure extending between the cavities.

21. The planar antenna, according to claim 20, wherein the cover plate has a thickness in the region of the plurality of cavities in the orthogonal direction with respect to the substrate that corresponds to half the wavelength or an integer multiple of the half wavelength of the generated microwaves.

22. The planar antenna, according to claim 20, wherein the cover plate has a dielectric arrangement in the region above the plurality of cavities operable to shape a beam of the microwaves generated by the planar radiator elements.

23. The planar antenna, according to claim 22, wherein the dielectric arrangement is operably fashioned as a lens.

24. The planar antenna, according to claim 23, wherein the surface of the cover plate is shaped convex in a direction of radiation of the microwaves to form the lens.

25. The planar antenna, according to claim 23, wherein the surface of the cover plate is shaped concave in a direction of radiation of the microwaves to form the lens.

26. The planar antenna, according to claim 20, wherein the cavities are shaped as antenna horns to form horn antennas.

27. The planar antenna, according to claim 26, wherein the inner surface of the antenna horns is conductive, in particular, formed with a metallization.

28. The planar antenna, according to claim 26, wherein a horn antenna inserts is provided, being inserted in the cavities to form the antenna horns.

29. The planar antenna, according to claim 28, wherein the horn antenna inserts are made from metallized plastic or metal.

30. The planar antenna, according to claim 20, wherein the cavities are fashioned as circular cylinders.

31. The planar antenna, according to claim 20, wherein the cavities are fashioned as cylinders having a polygon as the base surface.

32. The planar antenna, according to claim 20, wherein the cover plate is made of one of polytetrafluorethylene (PTFE), polypropylene (PP), and polyether ether ketone (PEEK).

33. The planar antenna, according to claim 20, wherein the cover plate is made from aluminum ceramics such as those containing aluminum oxide ($Al_2O_3$).

* * * * *